(12) United States Patent
Bentrim

(10) Patent No.: US 9,051,956 B2
(45) Date of Patent: Jun. 9, 2015

(54) PANEL FASTENER WITH HOLD-DOWN RING

(71) Applicant: PEM Management, Inc., Wilmington, DE (US)

(72) Inventor: Brian Bentrim, Furlong, PA (US)

(73) Assignee: PEM Management, Inc., Wilmington, DE (US)

( * ) Notice: Subject to any disclaimer, the term of this patent is extended or adjusted under 35 U.S.C. 154(b) by 49 days.

(21) Appl. No.: 14/060,696

(22) Filed: Oct. 23, 2013

(65) Prior Publication Data

US 2014/0119850 A1     May 1, 2014

Related U.S. Application Data

(60) Provisional application No. 61/718,466, filed on Oct. 25, 2012.

(51) Int. Cl.
| | |
|---|---|
| *F16B 41/00* | (2006.01) |
| *F16B 29/00* | (2006.01) |
| *F16B 5/02* | (2006.01) |
| *F16B 37/14* | (2006.01) |

(52) U.S. Cl.
CPC ............... *F16B 29/00* (2013.01); *F16B 41/002* (2013.01); *F16B 5/0208* (2013.01); *F16B 37/14* (2013.01)

(58) Field of Classification Search
CPC ...... F16B 41/002; F16B 5/0208; F16B 29/00; F16B 37/14
USPC .......................................... 411/107, 353, 999
See application file for complete search history.

(56) References Cited

U.S. PATENT DOCUMENTS

| | | | | |
|---|---|---|---|---|
| 5,749,690 | A | * | 5/1998 | Kutz .............................. 411/431 |
| 6,033,168 | A | * | 3/2000 | Creely et al. ................... 411/107 |
| 6,079,923 | A | * | 6/2000 | Ross et al. ..................... 411/353 |
| 2010/0132178 | A1 | * | 6/2010 | Chiu ............................ 29/281.5 |
| 2011/0070049 | A1 | * | 3/2011 | Wang .......................... 411/372.6 |
| 2012/0189400 | A1 | * | 7/2012 | Chiu .............................. 411/82 |
| 2012/0251265 | A1 | * | 10/2012 | Chiu ............................. 411/349 |

* cited by examiner

*Primary Examiner* — Flemming Saether
(74) *Attorney, Agent, or Firm* — Ryder, Lu, Mazzeo & Konieczny, LLC; Joseph M. Konieczny, Sr.; Gregory J. Gore

(57) ABSTRACT

A retractable panel fastener includes a hold down mechanism that holds the screw in an extended position. A deformable ring around the outside of the retainer engages an inward facing lip at the bottom of a cap which is rigidly attached to the head of the screw. The ring is held in a groove on the retainer adjacent the bottommost travel of the cap. The ring may be composed of silicone.

7 Claims, 1 Drawing Sheet

PANEL FASTENER WITH HOLD-DOWN RING

RELATED APPLICATION

This patent application is a non-provisional of provisional patent application Ser. No. 61/718,466 entitled "Panel Fastener with Hold-Down Ring" filed on Oct. 25, 2012, priority from which is hereby claimed.

FIELD OF THE INVENTION

This invention relates to a retractable panel fastener having means to secure the screw in its extended position. More specifically it relates to means operative between the screw cap and the retainer to hold the screw/cap assembly in its extended position.

BACKGROUND OF THE INVENTION

Extendable panel fasteners have a variety of applications including assembly to a printed circuit board which most recently utilizes surface mount technology (SMT). Retractable panel fasteners allow a considerable float of the screw relative to the retainer portion to compensate for misalignment, however this flexibility presents a difficulty in the pick-and-place aspect of the circuit board surface mount process. In the pick-and-place process, the fastener is held (typically pneumatically) by the topmost portion of the screw and then placed onto the printed circuit board (PCB). The above-mentioned floating nature of the integrated cap/screw portion with regard to the retainer result in the retainer not always being centered under the screw and hence, since placement is controlled by the position of the screw, the retainer might not find its intended mounting hole in the PCB.

A solution for this problem known in the art is to provide a panel fastener which has means to hold itself in its compressed, screw-extended position so that a firm and stable centered assembly is provided to the pick-and-place surface mount assembly process. One example of such a device is described in U.S. Pat. No. 8,113,755 issued to Wang. In accordance with this document, a stop ring such as an o-ring or a nut is placed about the end of the screw and positioned to abut the end of the retainer when the screw is in its extended position. Once the panel fastener has been assembled to the PCB, the ring or nut is removed. While this solution solves the pick-and-place problem of a floating SMT panel fastener, it is less than ideal since it requires the additional step of removal of the nut and ring and the attendant problem of disposing of the scrap waste.

SUMMARY OF THE INVENTION

In order to solve the need in the art described above, the present invention has been devised to maintain a floating spring-biased retractable panel fastener in its extended position while it is being assembled to a PCB during a surface mount process. According to the present invention, to keep the cap/screw portion of the panel fastener secured in its compressed, extended position, a ring or band of rubber is added to the outside of the retainer held in a groove that locates the ring relative to the other components of the fastener. As will be described in more detail below, the structural design features are chosen such that the ring interferes with a lip along the bottom edge of the cap to frictionally restrict its movement in its downward-most (screw extended) position.

More specifically, the application has devised a panel fastener including a screw with a head and a retainer having a bore for slideably receiving a shank of the screw. A cap is rigidly affixed to the screw head and has a downwardly extending tubular body with an inwardly facing peripheral lip along its bottommost edge which surrounds the retainer. The lip axially captivates the screw in the retracted direction by contact with a top flange of the retainer. A compliant deformable ring is located around the outside of the retainer and is sized to have an outer diameter that is greater than the inner diameter of the screw cap lip. The cap/screw assembly can be held in an extended position by pushing the lip of the cap downward past the ring. A groove around the outer surface of the retainer secures the ring axially to resist the force of the cap as it moves against and over it. The groove is preferably located so that the ring can hold the cap at the very bottom of its travel in its fully extended position which is limited by contact between the inner topmost portion of the cap and the top of the retainer. The ring may be composed of any suitable compliant material such as silicone.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
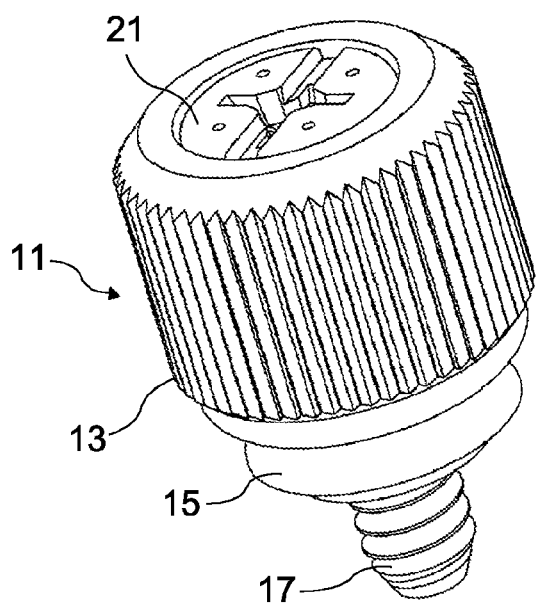
FIG. 1 is a perspective view of the present panel fastener in its extended position.
Figure 2:
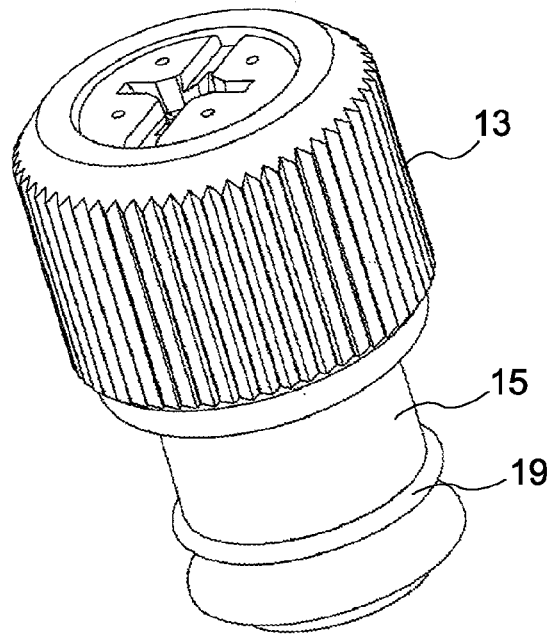
FIG. 2 is a perspective view of the present panel fastener in its retracted position.

Referring now to the Figures of Drawing, beginning with FIG. 1, the panel fastener of the present invention [11] is shown in perspective view. The fastener components include a screw having a head [21] with a tool-receiving feature for turning the screw. Rigidly affixed to the screw is a surrounding cap [13] which is heavily fluted to facilitate manual turning of the screw. A retainer [15] captivates the cap/screw assembly and retains it slidably between retracted and extended positions. A compression spring usually operates between the screw and retainer to bias the screw toward its extended position as well known in the art, however the invention performs equally without a spring so none is shown in this embodiment. The extended position is shown in FIG. 1 while the retracted position is shown in FIG. 2.

Figure 3:
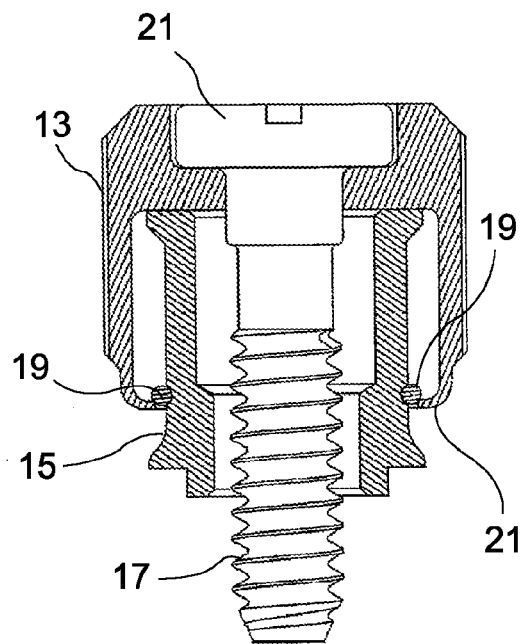
FIG. 3 is a elevation, partial cross-sectional view of the present panel fastener in its extended position.

Referring now to FIG. 3, the extended position of FIG. 1 is shown in cross section. In this position, the cap/screw assembly is in its downward-most position. A ring [19] is positioned on the retainer in a groove that locates the ring. The ring and groove are sized to prevent the ring from moving axially up and down on the retainer but keep it positioned in the groove. The ring protrudes far enough to be larger than the inner diameter of the bottom lip [21] of the cap [13]. The groove and ring are positioned axially to catch the cap at the very bottom of its travel when the cap/screw assembly contacts a hard stop created by the top of the retainer as shown in this Figure. At this hard stop position the ring should be just past center of the ring diameter but still over the ring as depicted. This captures the cap with sufficient force to overcome the force of a spring if one is used and keeps the assembly joined together and in a centered and rigid (non-floating) position.

Figure 4:
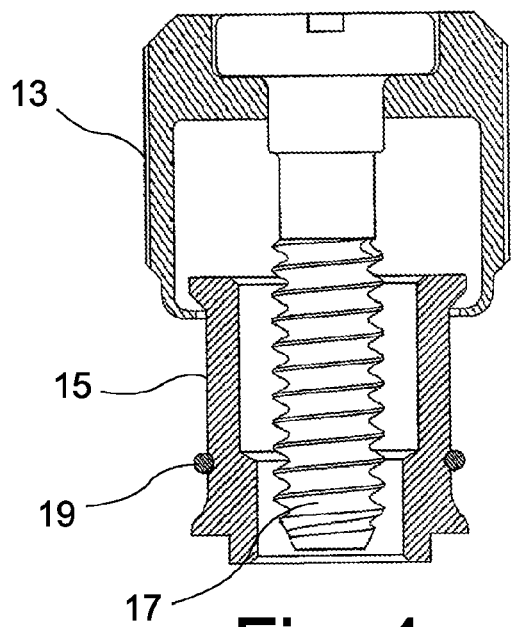
FIG. 4 is a partial elevation, cross-sectional view of the present panel fastener in its retracted position.

Referring now to FIG. 4, the ring is of a material compliant enough to allow the cap to roll past and deform the ring out of its way to achieve its extended position as depicted here. The ring [19] remains firmly held in the groove of retainer [15] while screw [17] and its attached cap it pulled upward, shown here in its upper-most position. The ring material is chosen to withstand the temperatures of the soldering during the surface mount process. The material of the ring should not become so soft or compliant that under the elevated temperatures it releases the cap/screw from the retainer or the fastener could jump during the SMT process as its spring is released. A silicone material is a good candidate for the ring, but other materials are possible. Furthermore, because it is important for the cap to be easily pulled back over the ring, the ring must not harden during the surface mount process. Once the cap has moved past the ring as shown in FIG. 4, the panel fastener retains its full functionality and can be used in its usual manner.

One major advantage of the present invention over the prior art is that the retaining ring is a permanent feature of the retainer and need not be removed. Thus it does not produce any scrap or waste or require additional labor to remove once the SMT process is complete. It does not aesthetically detract from the appearance of the panel fastener.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What it claimed is:

1. A panel fastener, comprising:
   a screw having a head;
   a retainer having a bore for slideably captivating the screw between retracted and extended positions;
   a cap rigidly affixed to the screw, said cap having a downwardly extending tubular body portion with an inwardly facing peripheral lip at the bottom; and
   a compliant deformable ring located around the outside of the retainer, said ring having an outer diameter greater than an inner diameter of the lip such that said screw is held in the extended position after the lip has been pushed downwardly past the ring.

2. The panel fastener of claim 1 further including a groove in which the ring is located for axially retaining the ring.

3. The panel fastener of claim 2 wherein the groove is positioned on the retainer such that the ring axially holds the screw at a bottom of its extended travel.

4. The panel fastener of claim 3 wherein the bottom of the travel of the screw is defined by the contact between the top of the retainer and an inner topmost portion of the cap.

5. The panel fastener of claim 4 wherein the ring is composed of silicone.

6. The panel fastener of claim 5 wherein the outside of the tubular body portion of the cap is fluted to facilitate manual turning.

7. The panel fastener of claim 6 further including a tool-receiving feature in the head of the screw.

\* \* \* \* \*